Patented Aug. 25, 1942

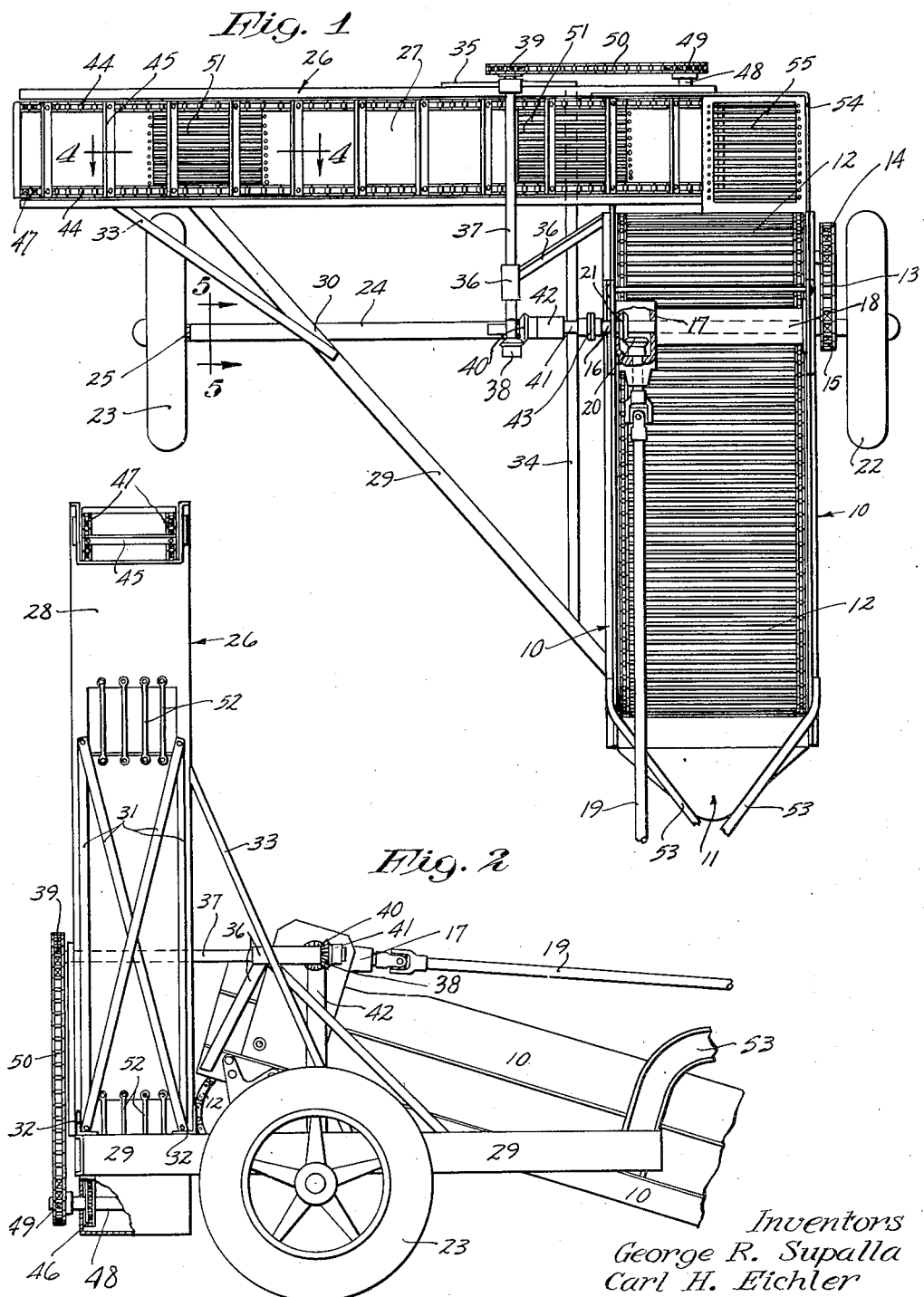

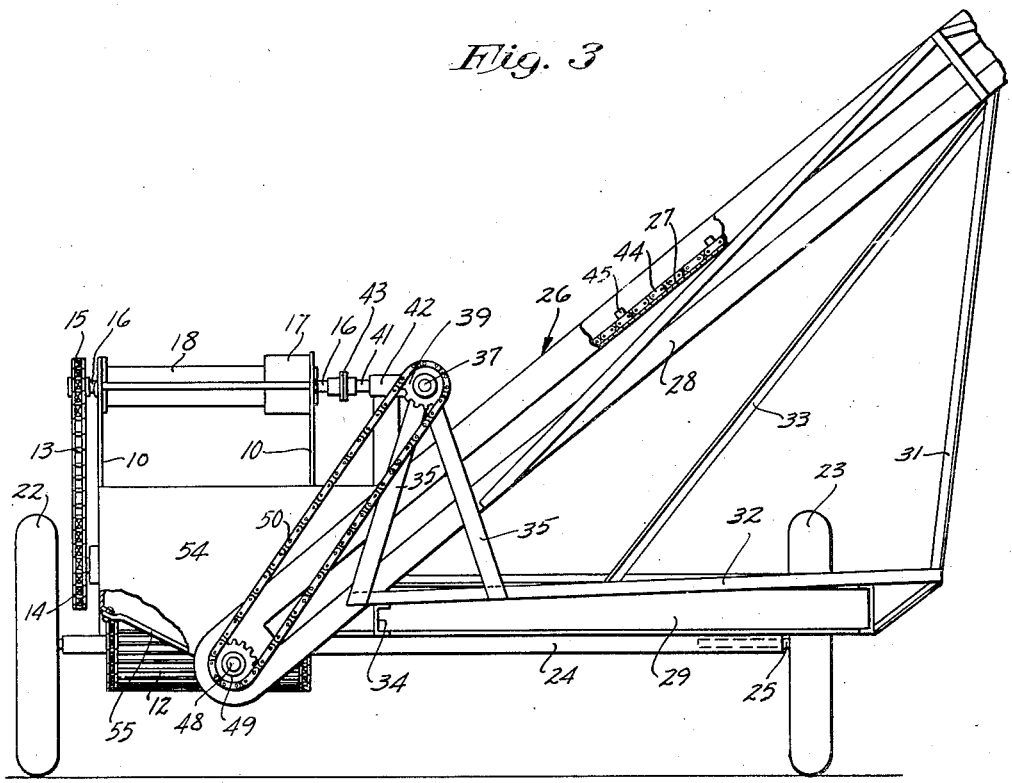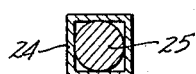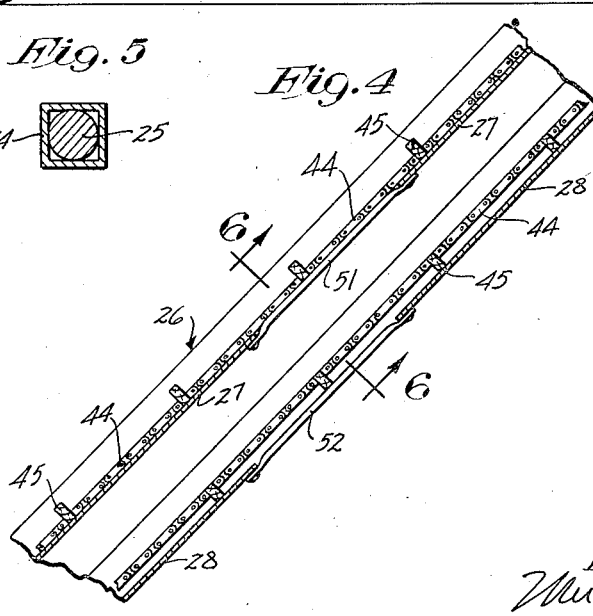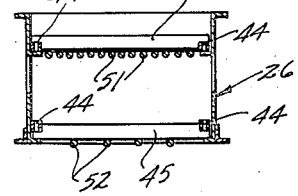

2,294,252

UNITED STATES PATENT OFFICE 2,294,252

MACHINE FOR DIGGING AND LOADING POTATOES, BEETS, AND THE LIKE

George R. Supalla, Easton, and Carl H. Eichler, Frost, Minn.

Application November 2, 1940, Serial No. 364,042

1 Claim. (Cl. 55—51)

Our invention has for its object to provide an important improvement in machines for digging potatoes, sugar beets and the like and for delivering the same in clean condition or freed from dirt or earthy matter into a wagon or receptacle driven or carried along at the side of the machine.

Hitherto machines for digging potatoes, beets and the like have been provided and are in commercial use, but in which arrangement the potatoes are simply dug up, more or less of the dirt shaken therefrom, and the potatoes or beets dropped again onto the ground back of the digger.

In carrying out our invention we found it convenient to use a commercial potato digger, such as noted, but we add thereto an elevator of novel construction and arrangement which receives the potatoes from the primary digger, cleans or removes further earthy matter therefrom, elevates the same, and delivers the same at one side of the machine preferably into a wagon box driven at that side of the machine.

Our invention is illustrated in the accompanying drawings wherein like characters indicate like parts throughout the several views.

Referring to the drawings:

Fig. 1 is a plan view of the machine;

Fig. 2 is a side elevation of the machine looking at the same from the left toward the right in respect to Fig. 1;

Fig. 3 is a rear elevation of the machine, some parts being broken away;

Fig. 4 is an enlarged fragmentary section taken on the line 4—4 of Fig. 1;

Fig. 5 is a detail in section taken on the line 5—5 of Fig. 1; and

Fig. 6 is a section taken on the line 6—6 of Fig. 4.

We will first briefly describe the construction of the particular commercial digger here employed as the primary digger of our improved machine, as follows:

The framework of the primary digger is indicated as an entirety by the numeral 10 and this framework is provided at its receiving end with a forwardly and downwardly projecting shovel-like plow 11 which, under advance movement of the machine, digs into the ground and lifts up the potatoes, beets or the like, together with a large amount of earth.

In this type of primary digger, the dug up articles, such as potatoes or beets, will be primarily delivered from the plow 11 onto an endless slat and belt conveyor 12 that runs over suitable driving and driven sprockets and is driven through a sprocket chain 13 and sprockets 14 and 15, such as found in commercial diggers. Driving sprocket 15 is carried by a transverse driving shaft 16 that, in the usual way, is journaled in a gear housing 17 and an extension 18, and which parts are rigidly supported from the framework 10 in a position above the conveyor 12.

In the said commercial machine power for driving the conveyor 12 is conveyed through a shaft 19 that is extended to the tractor, not shown, and is arranged to be driven thereby through well-known mechanism. Shaft 19 is provided with a bevel pinion 20 that meshes with a bevel gear 21 on transverse shaft 16. In using the primary digger in accordance with our invention, we leave on or utilize the left-hand wheel 22 but remove the customary right-hand wheel 23 and place the removed right-hand wheel at a distance far from the right-hand side of the primary digger, as best shown in Fig. 1. Both of the wheels 22 and 23 are loosely journaled wheels. In making this transposition or application, we employ a very strong long transverse shaft or casing 24 that is preferably made by welding together two angle irons or two channel irons, thereby forming a rectangular tubular structure, the cross-section of which is shown in Fig. 5. The wheels 22 and 23 are preferably journaled on stub shafts 25 that are inserted into and welded or otherwise rigidly secured within the ends of the casing 24 and on which stub shafts or trunnions the said wheels are directly and loosely journaled so that they are capable of differential movements in turning around or travelling curves. The so-called casing 24 is a very rigid and strong structure in the form of a metal beam, that portion of which that extends through the framework 10 is rigidly secured thereto with the wheel 23 located far from the primary digger. The term "right" and "left" above used apply to the machine considered in respect to the direction that it travels and not in respect to Fig. 1. Obviously the machine can be built either for a right or left hand delivery.

The attachment or addition which we add to the primary digger involves an inclined elevator leg or frame 26 which has inclined upper and lower decks 27 and 28. The receiving end of this elevator leg 26 is rigidly secured to the lower portion of the framework 10 and its extended and elevated portion is supported by suitable brace or truss bars, preferably such as shown in Figs. 1, 2 and 3. As a base for this support an oblique but horizontally extended beam, preferably a metallic channel 29, at its front end is riveted, welded, or otherwise rigidly secured to the adjacent side of the framework 10 of the primary digger. The rearwardly and outwardly extended portion of the beam 29 is welded or otherwise rigidly secured to the extended portion of the axle casing or beam 24 at the point of their crossing or substantially at the point marked 30 on Fig. 1, and said beam 29 is extended beyond said member 24 and under the upper end of the elevator leg.

The lower ends of truss bars 31 are shown as rigidly secured to metallic angles 32 which, in turn, are rigidly secured on the beam 29, as best shown in Fig. 2. The upper ends of said truss bars 31 are secured to the bottom of the upper portion of the elevator leg 26. A truss bar 33 is also secured to the beam 29 at its lower end and to the leg 26 at its upper end. A metallic beam 34, see Figs. 1 and 3, is secured to the beam 29 at its front end and at its intermediate portion rests upon and is welded or otherwise rigidly secured to the intermediate portion of the casing 24.

As best shown in Fig. 3, the rear end of beam 34 and the extended end of beam 29 directly support and are rigidly secured to the angle bars 32. One of the angle bars 34 supports an upright bearing bracket in the form of an inverted V-shaped metal structure 35; and aligned with this bracket 35, but located forward thereof, is a co-operating upright bearing bracket 36. Journaled in the upper portions of the bearing brackets 35 and 36 is a counter-shaft 37 provided on its front end with a miter gear 38 and at its rear end with a sprocket 39. Miter gear 38 meshes with a miter gear 40 on a short shaft 41 that is journaled in a bearing post or bracket 42, the lower end of which is welded or otherwise rigidly secured to the intermediate portion of the axle casing or beam 24. The inner end of shaft 41 is aligned with and is connected to and for rotation with the shaft 16 by a suitable coupling 43.

Arranged to run over the decks 27 and 28 of the elevator leg 26 is an endless slat and belt conveyor preferably made up of a pair of laterally spaced sprocket chains 44 and chain-connecting cross slats 45. These sprocket chains 44 run over lower driving sprockets 46 and upper driven sprockets 47. Sprockets 46 are on the shaft 48 that is journaled in the lower portion of the elevator leg 26 and provided at its outer end with a sprocket 49. The sprocket chain 50 runs over the sprocket 49 and the heretofore noted sprocket 39, which latter is on the shaft 37. The upper or driven sprockets 47 are idle sprockets journaled in any suitable way to the upper portion of the sides of the elevator leg 26.

As important features the upper deck 27 of the elevator leg, at suitable intervals, is provided with large openings spanned by grates or grills preferably formed by spaced metal rods 51 rigidly secured to said upper deck 27. In a similar manner the lower deck 28, at suitable intervals, has openings spanned by grates or grills preferably also formed by laterally spaced metal rods 52 rigidly secured to said lower deck.

To enable the primary digger to be directly connected to a tractor, the frame 10 is shown as provided with forwardly converging metal drag bars 53.

Located at the delivery end of the primary digger, and at the receiving end of the elevator, is a hopper 54 rigidly secured both in respect to the primary digger frame 10 and in respect to the elevator leg 26. The bottom of this hopper 54 is inclined in a direction to cause the beets or potatoes delivered into the hopper to be directed to the receiving portion of the elevator; and to permit dirt to drop from the bottom of the hopper the said inclined bottom is in the form of a grill or open grate preferably formed by laterally spaced rods 55.

It will be noted that the wheel 23 is located quite a distance from the adjacent side of the digger frame 10 so that it gives a good support for the delivery end of the elevator, but it is also important to note that the said wheel 23 is located considerably inward from the delivery end of said elevator so that a wagon or rack may be driven along the side of the machine under the delivery end of the elevator and in a position to receive the delivered potatoes, beets or the like.

Through the driving mechanism described, it is obvious that when power is transmitted through driving shaft 19, the endless conveyors of the digger and of the elevator will be simultaneously driven in the proper directions. Assuming that things being harvested are beets, it is evident that under final movement of the machine the shovel-acting plow 11 will dig up the beets with a large amount of dirt and deliver the same onto the belt 12. As the commingled beets and dirt are carried by the conveyor 12, the greater part of the dirt or earth will be dropped through the conveyor and onto the ground, while the beets, with a considerable amount of earth or dirt adhering thereto, will be dropped onto the inclined grate 55 and by the latter delivered to the elevator belt 44. In the dropping of the beets onto the grate 55 much of the earth that is adhered thereto will be loosened and dropped through the said grate while the beets in further cleaned condition will, as stated, be delivered to the elevator belt and to the lower end of the upper deck 27. Under the action of the elevator belt the articles, assumed to be beets, will be taken up by the slats 45 and conveyed up the deck 27 with more or less of a rolling action of the beets so that nearly all of the remaining earth adhering to the beets after they are delivered to the elevator belt will be loosened up.

As the beets and the loosened earth are carried upward on the upper deck 27, they will be caused to pass the grates 51 and the finally loosened earth will drop through the said grates. By reference particularly to Fig. 4, it will be noted that the lower grates 52 are located vertically under the upper grates 51 so that loosened earth will drop directly to the ground through the lower grates. If any of the dirt should adhere to the lower deck 28, it will be scraped off by the returning lower cleats 45 and caused to drop through one or the other of the lower grates 52.

Under the above actions the beets, potatoes or other articles dug up will be very well cleaned of earth before they reach the delivery end of the elevator.

While we have illustrated a commercial embodiment of our invention, it will be understood that various minor changes may be made therein all within the scope of the invention herein disclosed and claimed.

What we claim is:

In a machine of the kind described, a frame work, a shovel-like plow connected to and projecting forward of said frame work, a slat and belt conveyor receiving from said plow, a hopper receiving from said slat and belt conveyor and having a grate-like bottom, and a power-driven transversely extended elevator including an elevator belt receiving from the grate-like bottom of said hopper, an inclined deck over which said elevator belt is moved, said deck having a grate-like bottom, and driving connections for simultaneously operating the said two slat and belt conveyors.

GEORGE R. SUPALLA.
CARL H. EICHLER.